(No Model.) 2 Sheets—Sheet 2.

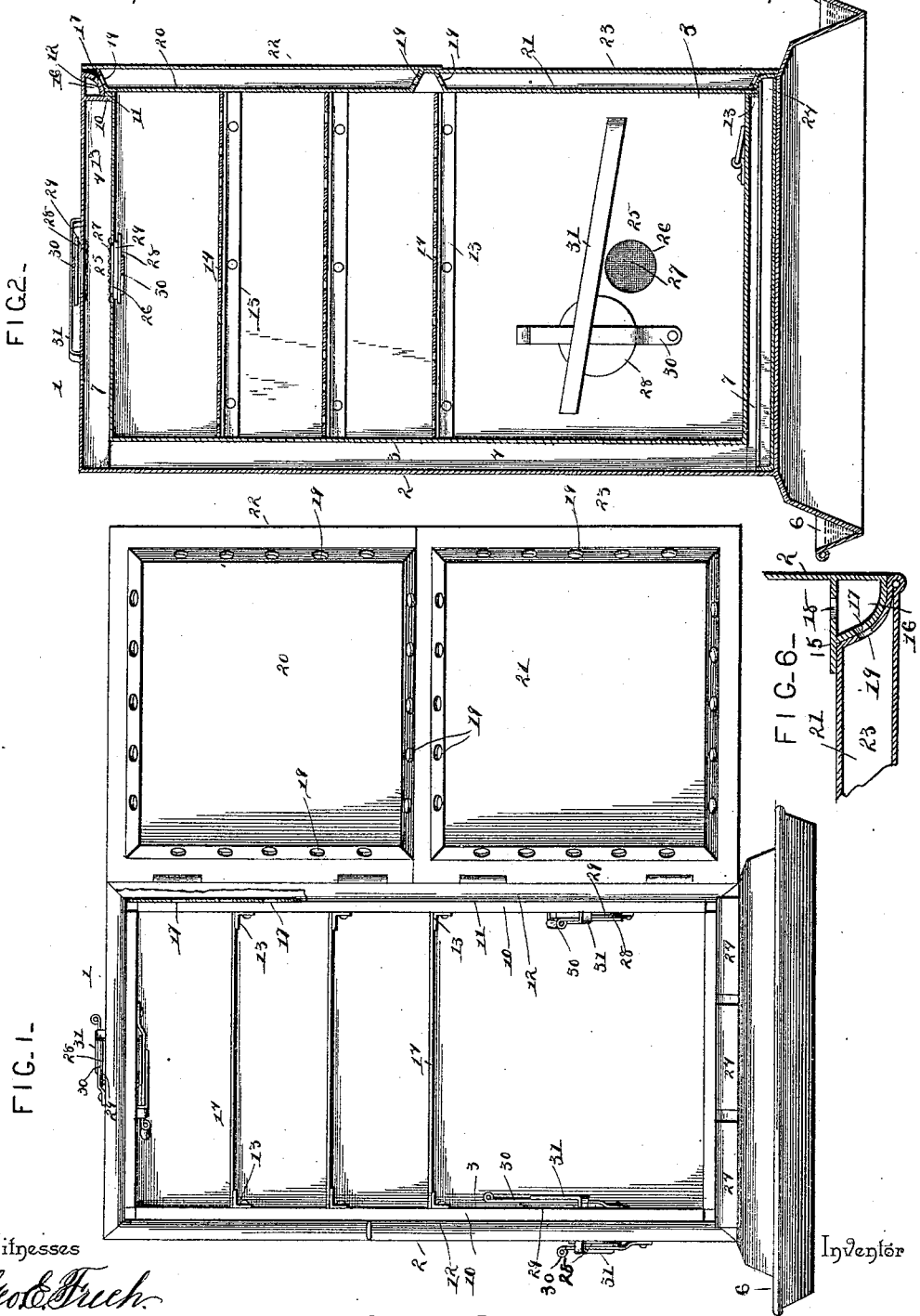

W. H. REYNOLDS.
SAFE.

No. 460,660. Patented Oct. 6, 1891.

Witnesses
Geo. E. Frech
H. F. Riley

Inventor
Willie H. Reynolds

By his Attorneys,
C. A. Snow & Co.

UNITED STATES PATENT OFFICE.

WILLIE HARRISON REYNOLDS, OF RACINE, WISCONSIN.

SAFE.

SPECIFICATION forming part of Letters Patent No. 460,660, dated October 6, 1891.

Application filed October 30, 1890. Serial No. 369,848. (No model.)

*To all whom it may concern:*

Be it known that I, WILLIE HARRISON REYNOLDS, a citizen of the United States, residing at Racine, in the county of Racine and State of Wisconsin, have invented a new and useful Safe, of which the following is a specification.

The invention relates to improvements in kitchen-safes.

The object of the present invention is to provide a simple and inexpensive kitchen-safe adapted for the reception of various articles and capable of keeping the same cool and moist, and thereby preserve them for considerable time.

A further object of the invention is to provide a safe in which the contents will be kept free from crawling insects, such as ants, and in which the parts may be readily removed for cleaning.

The invention consists in the construction and novel combination and arrangement of parts hereinafter fully described, illustrated in the accompanying drawings, and pointed out in the claim hereto appended.

Figure 4:
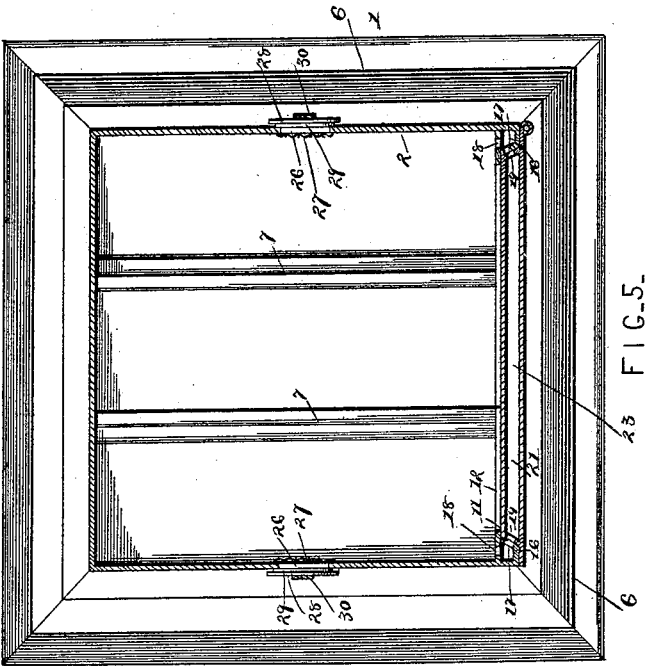
Figure 5:
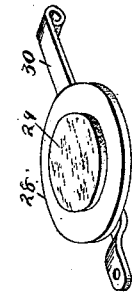
Figure 3:
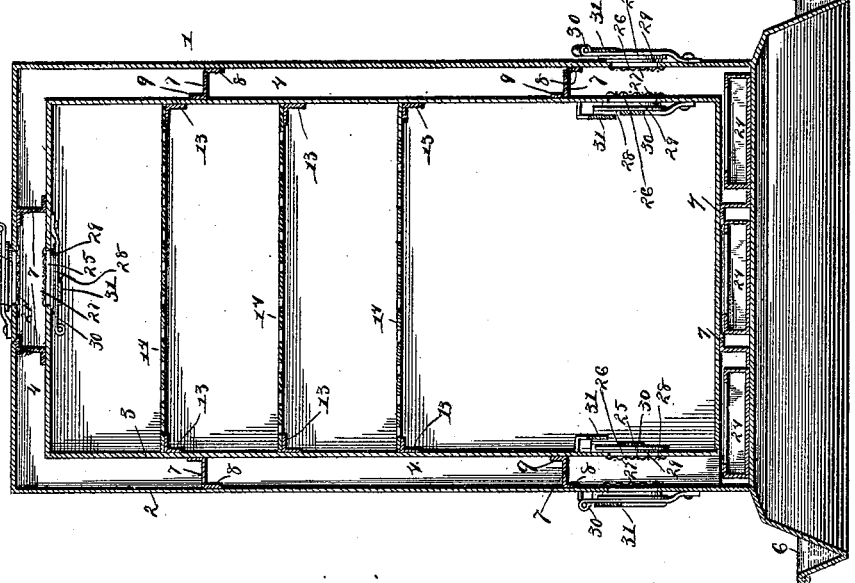

In the drawings, Figure 1 is a front elevation of a kitchen-safe constructed in accordance with this invention, the doors being open. Fig. 2 is a central vertical sectional view. Fig. 3 is a similar view taken at right angles to Fig. 2. Fig. 4 is a horizontal sectional view, the inner casing being removed. Fig. 5 is a detail view. Fig. 6 is an enlarged detail sectional view of the door and jamb.

Referring to the accompanying drawings, 1 designates a kitchen-safe composed of an outer casing 2 and an inner casing 3, which is smaller than the outer casing 2, and is separated therefrom by an air-space 4, which permits a free ventilation entirely around the inner casing to cause an evaporation of water placed in the said space to keep the contents of the inner casing cool and moist. The outer casing is constructed of suitable material, preferably sheet metal, and has its base 5 provided with a groove 6, extending entirely around the safe and adapted to contain water to exclude ants and other crawling insects.

The inner casing is constructed of sheet metal similar to that of the outer casing and is supported within the latter and maintained at its relative position thereto by sheet-metal braces 7, which are arranged horizontally on the side walls of the outer casing and vertically on the bottom of the same, and those on the bottom support the inner casing, while those at the sides keep the same at a proper distance from the outer casing to form the air-space 4. The braces 7 have their longitudinal edges oppositely bent to form flanges 8 and 9, the former of which is secured to the outer casing, and the latter presents a broad surface to the inner casing to enable the same to be readily removed from the outer casing and placed therein without receiving injury by contact with the braces.

The inner casing is adapted to be readily removed from the outer casing when it is desired to clean the latter, and it is provided around the edges of its opening with outwardly-extending flanges 10, which fit against the shoulder 11 of the jamb or door-casing 12 and prevent the inner casing being inserted too far and insure an air-space at its back or rear wall. The interior of the inner casing is provided with a series of brackets 13, which support perforated shelves 14.

The door jamb or casing 12 forms vertical flues at each side of the door and consists of a straight back portion 15 and a curved front 16, which may be formed by the edges of the outer casing being bent inward upon the back, and the said casing is provided with a series of perforations or openings 17 and 18, and the latter are arranged opposite to register with similar openings 19 of linings or backings 20 and 21 of hinged door 22 and 23, and the linings or backings are provided at their edges with flanges which cause them to stand out from the inner faces of the doors and form air-spaces, and by means of the registering openings or perforations ventilation is rendered complete and air is free to circulate entirely around the inner casing.

The outer casing is provided with drawers 24, which are arranged upon the bottom and are adapted to contain some absorbent material which will facilitate the evaporation of water from the drawers or pans to keep the contents of the inner casing cool and moist.

The inner and outer casings are provided with oppositely-disposed ventilators 25, which are arranged at the top and sides of the safe and consist of openings 26, covered with gauze 27, or the like, and adapted to be closed when not in use by a disk 28, provided on its inner face with felt 29 and mounted upon a bar 30, having one end pivoted and the other end arranged in a keeper 31 and adapted to be moved along the same to open and close the ventilator-opening. By means of the ventilators the air within the casing can be regulated and its humidity controlled.

What I claim is—

A kitchen-safe comprising the outer casing provided with a door-jamb having vertical air-flues at the sides of the door-opening and having perforations 17 and 18 and consisting of the straight back 15 and the curved front 16, formed integral with the side of the casing, and the doors provided with linings or backings forming air-spaces and having perforations registering with those of the jamb, substantially as described.

In testimony that I claim the foregoing as my own I have hereto affixed my signature in presence of two witnesses.

WILLIE HARRISON REYNOLDS.

Witnesses:
PETER RAETZ,
PETER LUDWIG.